Patented May 24, 1927.

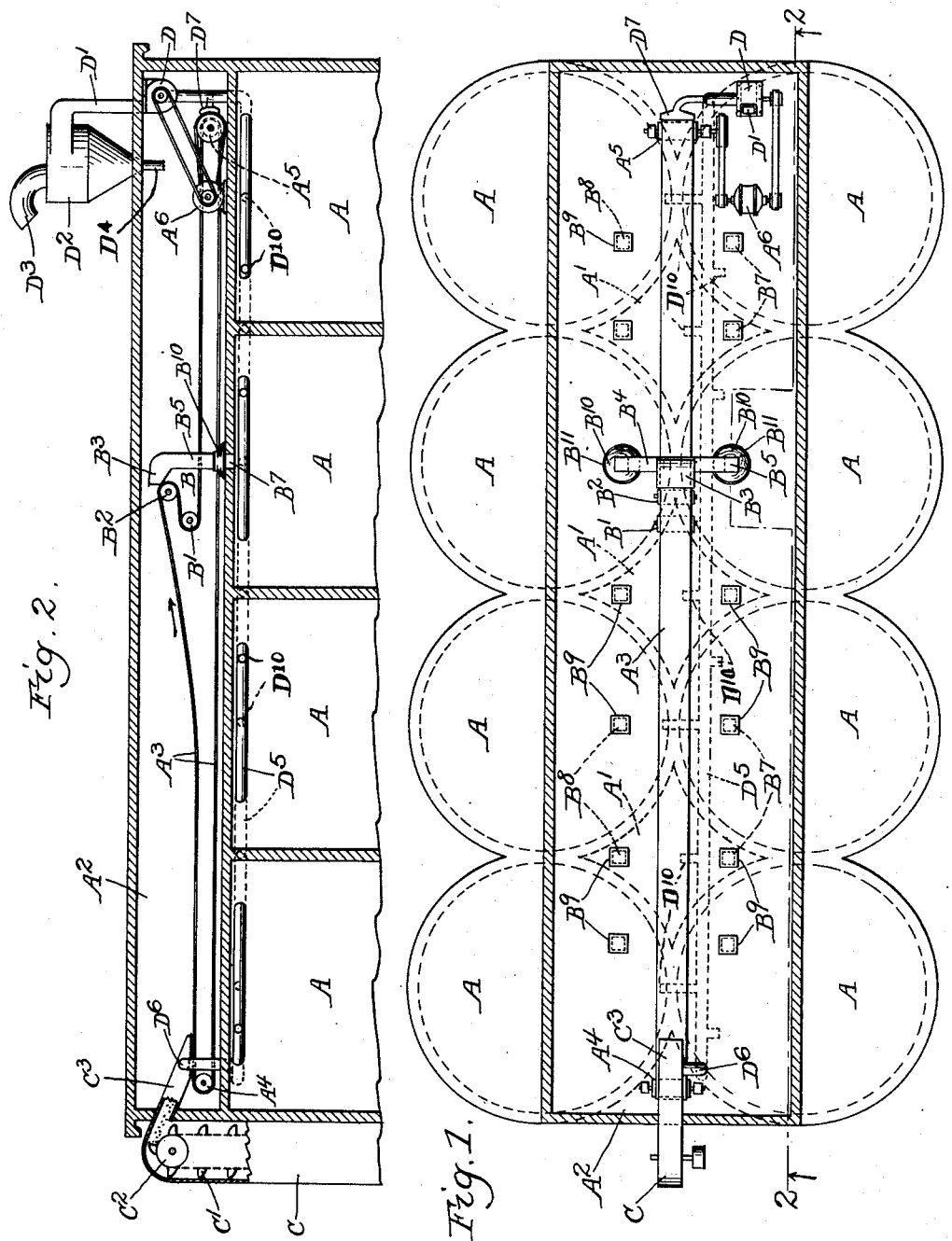

1,629,991

UNITED STATES PATENT OFFICE.

THOMAS D. BUDD AND WILLIAM R. SINKS, OF CHICAGO, ILLINOIS.

BIN-FLOOR DUST-COLLECTING SYSTEM FOR GRAIN ELEVATORS AND THE LIKE.

Application filed January 15, 1925. Serial No. 2,499.

Our invention relates to improvements in bin floor dust collecting systems for grain elevators and the like and has for one object to provide means whereby grain may be handled in a grain elevator and discharged into the various storage bins therein without the escape of dust and dirt into the air. Another object is to provide means for disposing of the air displaced with its accompanying dust from a bin by the inflow of grain thereto.

Grain bins in grain elevators are ordinarily relatively deep narrow receptacles from which grain is withdrawn at the bottom and to which grain is supplied at the top from a conveyor, which discharges through relatively small manholes in the bin cover. These manholes are normally closed by removable lids. When grain is to be fed to the bin, the manhole cover is removed, a tripper discharge associated with the conveyor belt is moved along to the proper bin and the grain is discharged thereby from the belt into the bin through the manhole. This grain comes in at high velocity and rapidly fills the bin. The rapid movement of the grain and the sudden change in its direction as it is discharged from the conveyor releases a great deal of dust and the inward flowing stream of grain filling the bin sets up a powerful current of air outwardly through the manhole in the opposite direction from the flow of the grain and this rapid current of air together with the rapid movement of the grain and its change in direction removes a considerable quantity of dust from the grain and distributes it about the top of the bins in the house. This dust problem in ordinary conditions is so serious that a staff of men are occupied all the time sweeping up this dust and disposing of it. It is impossible to tell from which batch of grain the dust comes from and so this dust which is made up of dirt, chaff and polishing from the grain is disposed of by the owner of the house and must be disposed of constantly to avoid fire and explosion danger.

Our invention is therefore adapted to decrease the liability of dust explosion, fire hazards and for ventilating and preventing the separation of dust in grain elevators and the like. It has for one object to provide means for positively circulating the dust laden air to and through the bin and part of the handling mechanism and provides a positive suction on the bin and on the grain handling apparatus for withdrawing dust therefrom and at the same time there is a positive system of ventilation for the elevator floor where work is taking place. This prevents the escape of dust and its deposition which results in fire and explosion hazard.

We propose to provide means whereby the air displaced by the grain will be drawn off from the bin through a passage separate from the grain receiving manhole at such a rate of speed that there will always be a minus pressure in the bin and so that there will be a sufficient air current passing in with the grain to catch all the dust and convey it into and through the bin through such air discharge passage to a point where it can be conveniently handled in bulk.

Our invention is illustrated more or less diagrammatically in the accompanying drawings, wherein—

Figure 1 is a plan view of the bin floor and tops of the bins;

Figure 2 is a section through a grain elevator showing the storage bins and the handling apparatus in elevation;

Like parts are indicated by like characters throughout.

Figure 3:
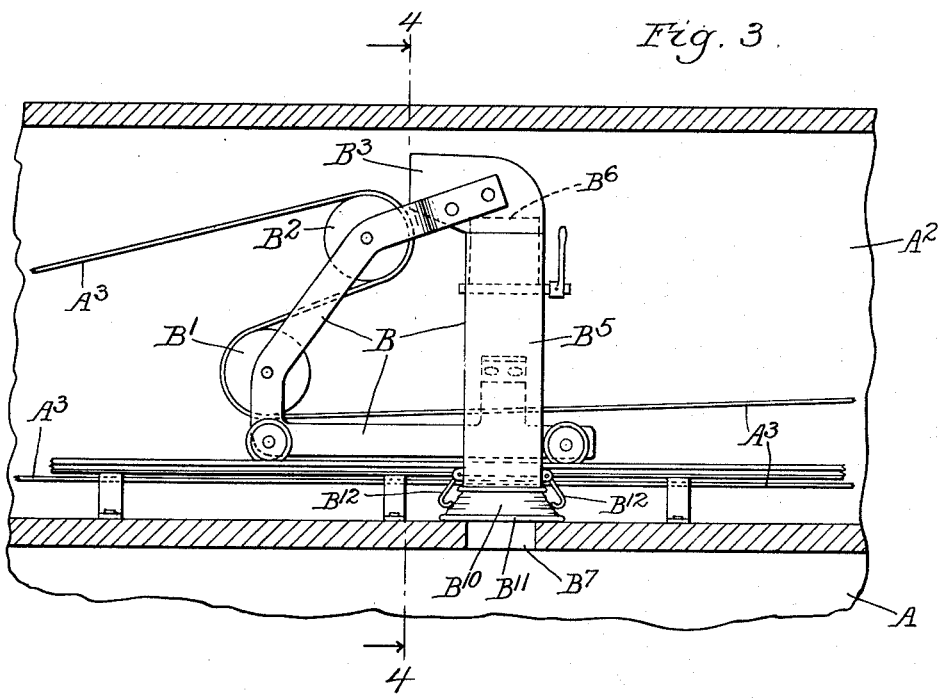
Figure 3 is a section through the house showing the conveyor and dumping mechanism in elevation.
Figure 4:
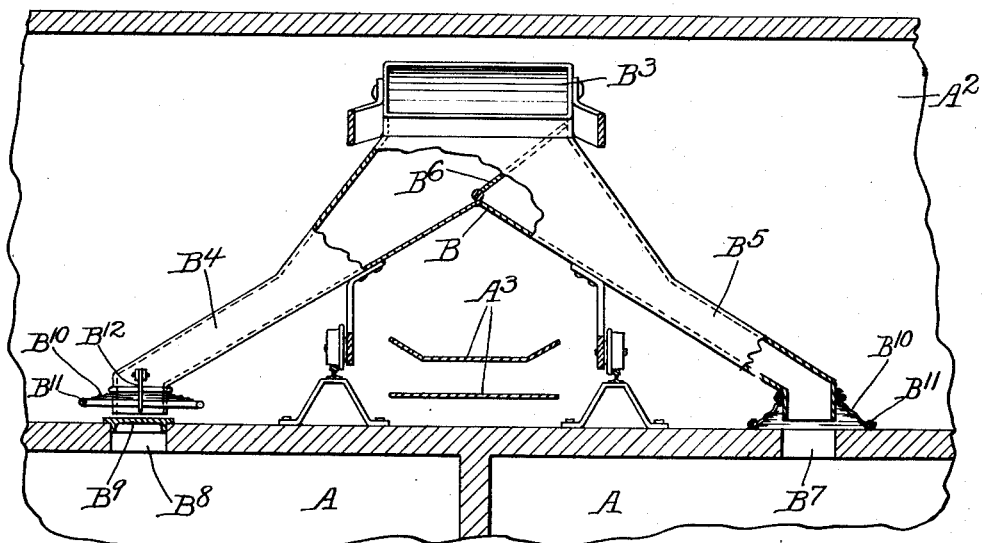
Figure 4 is a section 4—4 along the line drawn in Figure 3.

A A are a series of cylindrical grain bins. Disposed between them are a series of smaller bins $A^1$. Located above all these bins is a conveyor house $A^2$. Extending longitudinally through this conveyor house along the axial line of the bin assembly is an endless belt conveyor $A^3$ having a tail pulley $A^4$, a head pulley $A^5$ and a driving motor $A^6$.

Adjustably movable along the bin floor and along the axis of the belt conveyor is a tripper discharge B. This tripper discharge is adapted to move along the floor and comprises two pulleys $B^1$ $B^2$ so disposed as to make a kink in the belt on the carrying side. The pulley $B^2$ is located in the mouth of an air tight receiving chute $B^3$ so disposed that material passing over the pulley $B^2$ is thrown by inertia into the chute and may be discharged into either arm $B^4$ $B^5$ of the tripper discharge by means of a valve $B^6$. The tripper discharge arms or branches are so disposed that as the tripper is moved along the floor, they can be placed selectively into register with manholes B⁷ B⁸ on opposite sides of the median line of the belt communicating with the various bins. Each manhole is provided with removable substantially air and dust tight covers B⁹. These covers are of course removed before the tripper discharge is brought into register with the manhole leading to the bin which is to be filled. Each of these tripper discharge arms terminates in an adjustable sleeve B¹⁰ making a substantially air tight connection with the lower extremity of the arm having a felt, canvas or similar dust and air tight packing rim B¹¹ so that when the sleeve is dropped down to rest upon the floor immediately around the manhole, a substantially air tight joint is provided.

The grain is fed to the belt conveyor by means of an elevating leg C containing a conveyor C¹ which discharges over a head pulley C² to a closed chute C³ whence the grain is discharged to the belt at the tail end thereof. The grain of course can be fed to the belt by any suitable means from any suitable source.

Driven by the belt driving motor is an air fan D. This fan always operates when the motor and belt are operating and is always at rest when they are at rest. The fan discharges through a conduit D¹ to a cyclone dust separator D² which discharges the air through a spout D³ outside the house and the recovered dust through a spout D⁴ to any suitable recovering or storage system not here shown. D⁵ is a suction line extending clear across the top of the house discharging into the fan D and having connection with each of the separate bins as indicated at D¹⁰ D¹⁰, and also a connection as at D⁶ to the feed spout C³ at a point between the head pulley C² and the discharge to the belt. There is also a connection between the suction line D⁵ and a dust hood D⁷ adjacent the head pulley of the belt.

It will be evident that while we have shown in our drawings an operative device still many changes might be made in the size, shape and arrangement of parts without departing from the spirit of our invention and we wish, therefore, that our showing may be taken as in a sense diagrammatic.

The use and operation of our invention are as follows:

Normally the bins are all closed with the air and dust tight manhole covers in place. When the operator is about to store a batch of grain in one of the bins, he first removes the manhole cover of that particular bin, then moves the tripper discharge into place so that one branch thereof is in register with the open manhole. He lowers the packing sleeve around the end of that branch to the floor to make a substantially air tight joint between the manhole and tripper discharge and throws the valve therein into position to discharge into the open manhole. He then commences the feed of grain to the belt. The grain travels along the belt to the tripper pulley and is there discharged into the tripper chute and passes through it into the bin. At the same time that the belt is started up the fan automatically starts and immediately puts a suction on the entire system. Since all but the manholes into which the grain is discharging into are closed, little if any air will be displaced from any of the bins not being filled. Most of the air will come from the bin or bins being filled and the fan is so speeded up that the volume of air drawn from the bins at any given time is greater than the volume of grain discharged into the bins. Thus all the air displaced by the grain is carried out by the fan and there is in addition a down draft of air from the belt through the tripper discharge into the bin. This down draft of air takes care of all the dust raised by the change in direction of the grain or by its discharge into the bin. This dust is carried out by the air through the suction line into the dust separator and there is recovered.

The connection between the suction line and the loader at the point of loading of the belt causes an inward flow of air in an opposite direction to the flow of grain toward the belt so that any dust raised at that point would also be taken into the suction system and the dust hood around the head pulley of the head conveyor will carry away the fine dust which experience shows is likely to adhere to the belt after it has passed through the tripper. Thus all the points at which the dust is likely to develop are protected by air current drawing the air into a closed dust collecting system whereby the dust is carried away to a point at which it can be safely and satisfactorily disposed of.

We claim:

1. In a grain elevator, a bin having a closed apertured top, means for discharging grain through said aperture and means operative in unison with the grain discharging means, for withdrawing the dust laden air from the bin and for separating the dust from such dust laden air.

2. In a grain elevator, a bin having a closed apertured top, means for discharging grain through said aperture and means operative in unison with the grain discharging means, for withdrawing the dust laden air from the bin and for separating the dust from such dust laden air, the air handling mechanism being adapted to withdraw from the bin a larger volume of air than that displaced by the inflowing grain.

3. In a grain elevator, a bin having a closed apertured top, a grain conveyor belt and means associated therewith for discharging grain therefrom to the bin through the aperture, a suction system communicating with the interior of the bin including an air displacing member driven simultaneously with the conveyor belt.

4. In a grain elevator, a bin having a closed apertured top, means for discharging grain through said aperture and means operative in unison with the grain discharging means, for withdrawing the dust laden air from the bin.

5. In a grain elevator, a plurality of separate grain bins having closed apertured tops and removable closures, a conveyor belt extending along the tops of said bins, and means for driving it, a tripper discharge associated with the belt, adjustably movable therealong and having a discharge spout adapted to register with said apertures, a suction system communicating with the interior of each bin and means for operating it in unison with the belt conveyor drive.

6. In a grain elevator, a plurality of separate grain bins having closed apertured tops and removable closures, a conveyor belt extending along the tops of said bins, and means for driving it, a tripper discharge associated with the belt, adjustably movable therealong, and having a discharge spout adapted to register with said apertures, a suction pipe communicating with each of said bins, a fan driven in unison with the belt drive and adapted to draw dust laden air from said bins through the pipe.

7. In a grain elevator, a plurality of separate grain bins having closed apertured tops and removable closures, a conveyor belt extending along the tops of said bins, and means for driving it, a tripper discharge associated with the belt, adjustably movable therealong, and having a discharge spout adapted to register with said apertures, a suction system communicating with the interior of each bin and means for operating it in unison with the belt conveyor drive, the apertures in all the bins except the one into which grain is being discharged being normally closed.

8. In a grain elevator, a plurality of separate grain bins having closed apertured tops and removable closures, a conveyor belt extending along the tops of said bins, and means for driving it, a tripper discharge associated with the belt, adjustably movable therealong, and having a discharge spout adapted to register with said apertures, a suction system communicating with the interior of each bin and means for operating it in unison with the belt conveyor drive, and a spout adapted to feed grain to the belt and a dust collector associated therewith and communicating with the suction system.

9. In a grain elevator, a plurality of separate grain bins having closed apertured tops and removable closures, a conveyor belt extending along the tops of said bins, and means for driving it, a tripper discharge associated with the belt, adjustably movable therealong, and having a discharge spout adapted to register with said apertures, a suction system communicating with the interior of each bin and means for operating it in unison with the belt conveyor drive, a dust collecting hood associated with the head end conveyor pulley and a connection between it and the suction system.

10. In a grain elevator, a plurality of separate grain bins having closed apertured tops and removable closures, a conveyor belt extending along the tops of said bins, and means for driving it, a tripper discharge associated with the belt, adjustably movable therealong, and having a discharge spout adapted to register with said apertures, a suction system communicating with the interior of each bin and means for operating it in unison with the belt conveyor drive, and a spout adapted to feed grain to the belt and a dust collector associated therewith and communicating with the suction system, a dust collecting hood associated with the head end conveyor pulley and a connection between it and the suction system.

11. In a grain elevator, a bin, means for discharging grain thereinto and means for withdrawing air from the bin at a point removed from the entrance of the grain at a rate greater than the rate of air displacement by the inflowing grain.

12. In a grain elevator, a bin having a closed apertured top, a belt conveyor extending across the top of the bin, a tripper discharge adapted to discharge the material on said belt through the aperture in the top, a dust tight closure between the tripper and the bin, means for drawing a current of air inwardly in the same direction as the flow of the grain to prevent escape of dust by the tripper discharge.

13. In a grain elevator, a bin having a closed apertured top, means for discharging grain through said aperture and means operative in unison with the grain discharging means. for withdrawing the dust laden air from the bin and from said discharging means into the bin, forming a primary dust settling chamber, and a dust collector forming a secondary means of recovering as much of the unsettled dust in the air as possible.

Signed at Chicago, Illinois, this 31st day of December 1924.

THOMAS D. BUDD.
WILLIAM R. SINKS.